S. T. EDMONSON.
HAY PRESS.
APPLICATION FILED NOV. 27, 1915.
1,246,569. Patented Nov. 13, 1917.
2 SHEETS—SHEET 1.
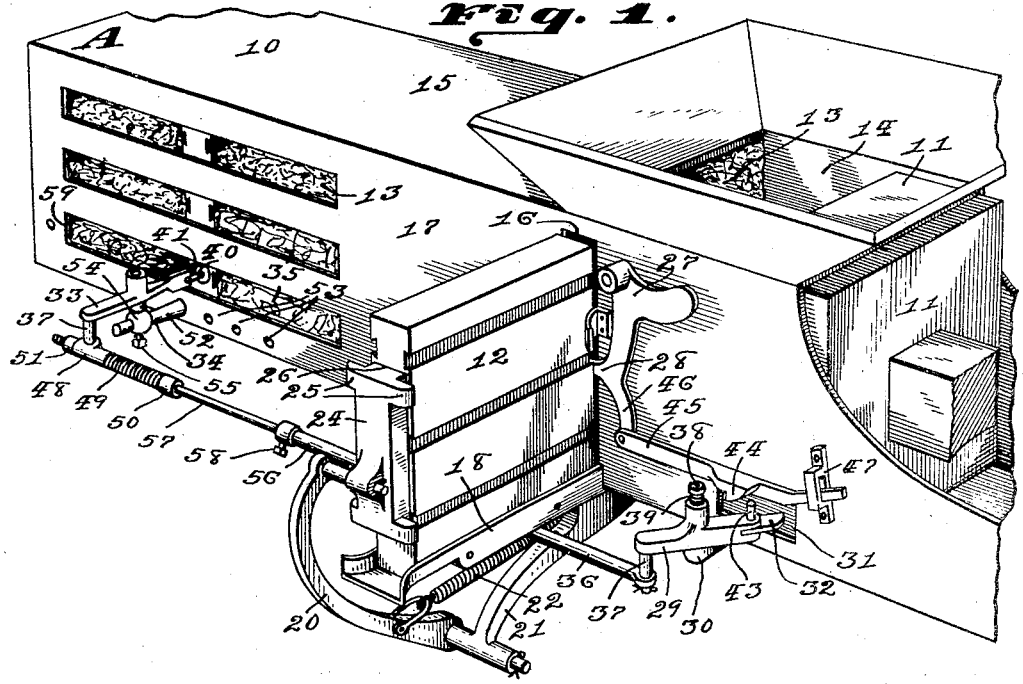
Fig. 1.
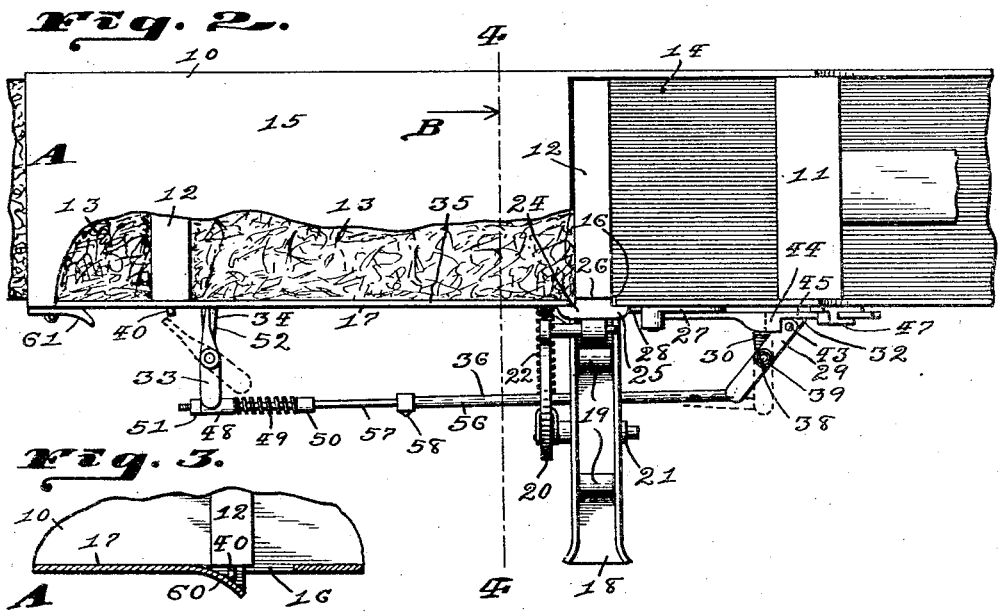
Fig. 2.
Fig. 3.
WITNESSES:
Muita De Ford
J. W. Bouse
INVENTOR:
Seth T. Edmonson.
BY
Frank P. Shepard.
ATTORNEY.

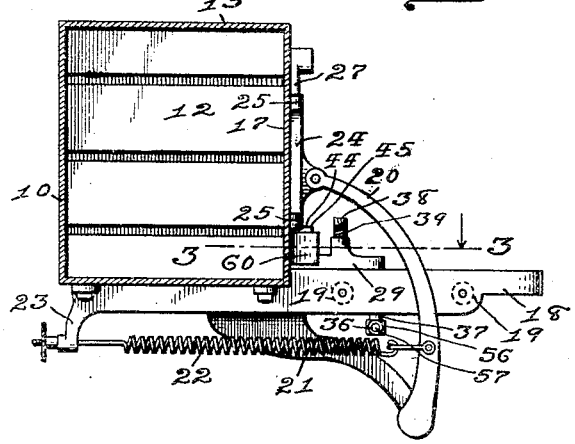
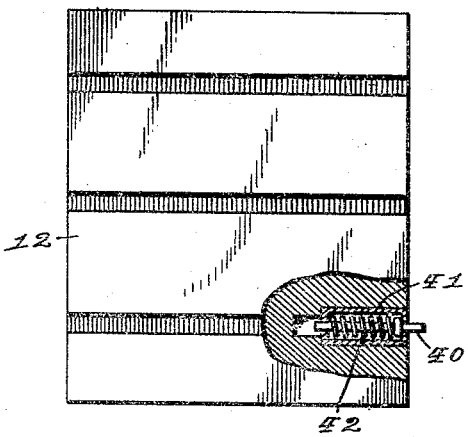
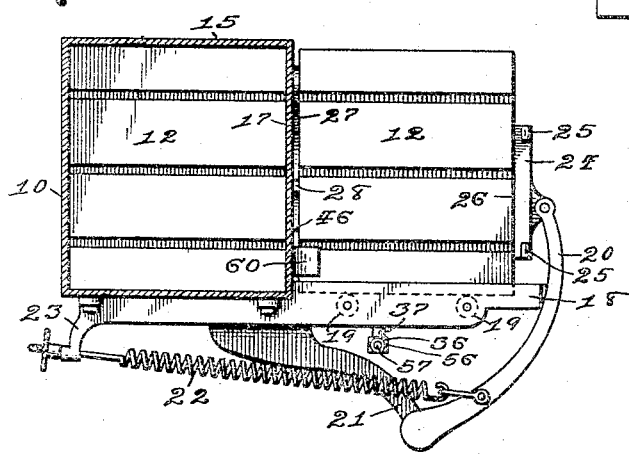

UNITED STATES PATENT OFFICE.

SETH T. EDMONSON, OF PERKINS, OKLAHOMA.

HAY-PRESS.

1,246,569.  Specification of Letters Patent.  Patented Nov. 13, 1917.

Application filed November 27, 1915. Serial No. 63,717.

*To all whom it may concern:*

Be it known that I, SETH T. EDMONSON, a citizen of the United States, residing at Perkins, in the county of Payne and State of Oklahoma, have invented certain new and useful Improvements in Hay-Presses, of which the following is a specification, reference being had to the accompanying drawings.

The invention pertains to improvements in hay presses, the object being to provide automatic means for insuring a uniform length of bales.

The accompanying drawings show one embodiment of the invention in practical form.

Figure 1 is a fragmental perspective view of the improved press.

Fig. 2 is a plan view of the parts shown in Fig. 1, but with the parts in different position and with a portion of the upper wall of the press-box broken away.

Fig. 3 is a fragmental sectional view in the same direction as Fig. 2 and on the line 3—3 of Fig. 4, but with the bale of hay omitted.

Fig. 4 is a sectional view taken on the line 4—4 of Fig. 2.

Fig. 5 is a sectional view taken on the same line 4—4 of Fig. 2, but with the parts in the same position as in Fig. 1.

Fig. 6 is an elevation view, partly in section, in the same direction as Figs. 4 and 5, showing a division-block.

The hopper of the press-box, shown in Fig. 1, is omitted in the other figures.

For purposes of this description, the discharge end of the press-box, designated by the letter A in Figs. 1 to 3, is taken as the front of the machine.

Like characters of reference designate like parts in all the figures.

The machine shown in this instance includes the usual press-box 10, the plunger 11 adapted to be given reciprocating movement in the press-box, and the division blocks 12 adapted to be inserted in the press-box to divide the bales 13 formed by the plunger.

Since any of the well known means may be employed for imparting to the plunger 11 its reciprocating movement in the press-box 10, no means is shown in this instance.

In place of inserting the division-block 12 into the press-box 10 through the usual feed opening 14 in its upper wall 15, an opening 16 is provided in the side wall 17 of the press-box, and said division-block is introduced through said opening 16.

A channeled support 18 projects out rigidly from the press-box 10 at the lower end of the opening 16, and supports the division-block 12 in position to be slid into the press-box, the support being provided with rollers 19 to reduce the frictional resistance of said division-block.

A lever 20, arranged to swing in a plane at right angles to the press-box 10, is fulcrumed to a supporting bracket 21, which may be cast as an integral part of the support 18.

A tension spring 22 is hitched to this lever 20 intermediate its ends and to a bracket 23, which may also be integral with the support 18, and this spring acts to draw the upper or free end of said lever toward the press-box 10 and thereby slide the division-block 12 into place in the press-box.

The lever 20 has at its free end a pivoted bearing-plate 24, this bearing-plate having side flanges 25 which abut the outer surface of the press-box 10 at the instant that the advance face 26 of said bearing-plate is flush with the inner surface of the press-box; this arrangement of the bearing-plate keeping it from being caught by the plunger 11 or otherwise interfering with said plunger.

A depending detent 27 is pivoted to the outer surface of the press-box 10 at the rear edge of the opening 16 and well upward toward the upper end thereof, this detent being so weighted that its point 28 normally projects at least part way across the opening into the path of movement of the division-block 12 to keep the latter from being slid into the press-box 10 by the lever 20 and spring 22.

Means operable by the completion of a bale 13 of predetermined length are provided to trip the detent 27 and allow the division-block 12 to be slid into the press-box 10 by the lever 20.

In arranging this means, a lever 29 is fulcrumed on a bracket 30 projecting from the press-box 10, this lever being positioned rearwardly of the opening 16 where one of its ends may be swung into the press-box 10 through an opening 31 and project into the path of movement of the plunger 11.

The inner end of this lever 29 has a pivoted tip 32 which yields resiliently to an advancing or pressing movement of the plunger 11 without moving said lever; but upon the rearward or retreating movement of the plunger the tip does not yield and the entire lever must be swung to initial position to avoid said plunger.

A similar lever 33 is fulcrumed on a bracket 34 projecting from the press-box 10, this lever being positioned forwardly of the opening 16 where one of its ends may project into the lower one of the series of bale-tying slots 35 commonly found in the side wall 17 of a press-box.

The outer ends of the two levers 29 and 33 are operatively connected by a rod 36, which pivotally engages depending pin portions 37 of said levers in order to pass under and clear the support 18; and the fulcrum pin 38 of one of these levers (preferably the rear one 29) is provided with a coil spring 39 adapted to produce enough friction on said lever to keep both levers from moving accidentally.

The outer edge of each division-block 12 is provided with a spring-actuated bolt 40 long enough to project out through the lower bale-tying slot 35, the supporting casing 41 of this bolt being sunk flush into the division-block and having a spring 41 which yieldably holds the outer end of said bolt normally projected a limited distance outward for tripping purposes.

Assuming the press-box 10 to contain a completed bale 13 partially discharged, a bale partially completed, and a division-block 12 between said bales, the feeding of a charge of hay into the press-box and the addition of said charge in pressed form to the partially completed bale by an advance stroke of the plunger 11 advances said bales and division-block one step—a distance of, say, two inches.

With the levers 29 and 33 set in the initial position shown in Figs. 1 and 2, and with the step-by-step advance movement of the division-block 12 in the press-box 10, the projecting bolt 40 of said division-block engages the inner end of the front lever 33 during one advance step or during the finishing portion of one step and the beginning portion of another and swings the inner end of the lever 29 into the press-box 10 behind the advancing plunger 11 into the shifted position indicated by the dotted representations in Fig. 2; and during this swinging movement of the lever 29 the upper end of the pin 43 which pivots the yieldable tip 32 slides under a forwardly-inclined hook 44 on a horizontal bar 45 which is pivoted to a depending portion 46 of the detent 27.

Upon the following retreating stroke of the plunger 11 it swings the rear lever 29 to initial position, the upper end of the pin 43 of said lever positively engaging the hook 44 of the bar 45 and tripping the detent 27 to allow the division-block 12 in the support 18 to be slid into the press-box 10 by the lever 20.

The rear or free end of the bar 45, which rests in a supporting bracket 47 on the press-box 10, inclines upward at a small angle with the plane of movement of the lever 29, so that when said lever is swung nearly to initial position the hook 44 of the bar 45 is raised clear of the pin 43 and the detent 27 allowed to drop back to normal or detaining position.

The swinging of the rear lever 29 to initial position also swings the front lever 33 to like position, provided the bolt 40 has passed out of engagement with said lever 33; but to allow retreating movement of the plunger 11 past the rear lever 29 in case the bolt has not passed entirely out of engagement with the lever 33 the rod 36 is arranged to yield resiliently to compression thrust and allow said lever 29 to swing.

In providing for the yielding of the rod 36, its front pivotal eye 48, by which it engages the front lever 33, is arranged as a block to slide upon it, and a compression helical spring 49 embracing the rod is interposed between said block and a fixed stop 50 on the rod; a nut 51 being screwed onto the end of the rod to limit the sliding movement of the block at normal maximum length of said rod.

The front bracket 33 may be adjusted to different positions along a fore-and-aft line of the press-box 10 to form bales 13 of desired lengths.

To allow this adjustment, the bracket 34 may consist of a short rod 52 which has its inner end screwthreaded and adapted to be screwed into any one of the series of screw-threaded holes 53 in the lower edge of the press-box 10; the lever 33 being fulcrumed to a block 54 which embraces said rod 52 and is clamped thereto by a set-screw 55.

Since a change in the position of the brackets 34 and lever 33 would require a change in the length of the rod 36 which connects the two levers 29 and 33, this rod consists of two portions 56 and 57 adapted to telescope together, the outer tubular portion 56 having at its end a set-screw 58 to clamp the inner portion 57 against movement.

To keep the bolt 40 from locking against the edge of the opening 16 and against the front end 59 of the bale-tying slot 35 as the division-block 12 moves through the press-box 10, the inner surface of said press-box is formed with an outset incline 60, as shown in Fig. 3, and said slot is provided with a similar incline 61 riveted to said press-box.

Having thus described the invention, I claim:

1. In a hay press, a press-box, resilient means for forcing a division-block into the press box, a detent pivoted to the press-box and adapted to project normally into the path of said division-block, a plunger adapted to have reciprocating movement in the press-box, and means whereby a retreating movement of the plunger following the completion of a bale of predetermined length withdraws the detent from the path of movement of the division-block.

2. In a hay press, a press-box, a plunger adapted to have advancing and retreating movement in the press-box, resilient means for forcing a division-block into the press-box, releasable means for holding the division-block from entering the press-box, a tripping member pivoted to the press-box and projecting into the path of movement of the plunger, and an operative connection between said tripping member and said holding means.

3. In a hay press, a press-box, a plunger adapted to have advancing and retreating movement in the press-box, resilient means for forcing a division-block into the press-box, releasable means for holding the division-block from entering the press-box, a lever pivoted to the press-box and adapted to be swung into the path of movement of the plunger, means whereby completion of a bale of predetermined length swings said lever into the path of movement of the plunger, means whereby the plunger may pass said lever in advance direction, means whereby a retreating movement of the plunger swings said lever out of its path, and an operative connection between said lever and the means employed to hold the division from entering the press-box.

4. In a hay-press, a press-box, a plunger adapted to be given advancing and retreating movement in the press-box, resilient means for forcing a division-block into the press-box, releasable means for holding the division-block from entering the press-box, a lever pivoted to the press-box and adapted to be swung into the path of movement of the plunger, said lever having on its end a yieldable tip adapted to allow passage of the plunger in advance direction without moving said lever and adapted to prevent movement of the plunger in retreating direction without moving said lever, and an operative connection between said lever and the means employed to hold the division-block from entering the press-box.

5. In a hay press, a press-box, a plunger adapted to be given advancing and retreating movement in the press-box, resilient means for forcing a division-block into the press-box, releasable means for holding the division-block from entering the press-box, a lever pivoted at the rear end of the press-box and adapted to be swung into the path of movement of the plunger, means whereby when the lever is swung into the path of movement of the plunger said plunger may freely pass it in advance direction but positively engage it upon a retreating movement, a second lever pivoted to the front end of the press-box and adapted to be acted upon by a passing division-block, an operative connection between the two levers, and an operative connection between the first-named lever and the means employed to hold the division-block from entering the press-box.

Witness my hand this 19 day of October, 1915.

SETH T. EDMONSON.

Witnesses:
J. P. WOOLSEY,
J. W. BOUSE.

Copies of this patent may be obtained for five cents each, by addressing the "Commissioner of Patents, Washington, D. C."